United States Patent
Jeong

(10) Patent No.: US 10,021,235 B2
(45) Date of Patent: *Jul. 10, 2018

(54) METHOD FOR CONTROLLING ELECTRONIC DEVICE

(71) Applicant: Han Uk Jeong, Seoul (KR)

(72) Inventor: Han Uk Jeong, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/983,523

(22) Filed: Dec. 29, 2015

(65) Prior Publication Data

US 2016/0191692 A1   Jun. 30, 2016

Related U.S. Application Data

(63) Continuation of application No. 14/384,696, filed on Sep. 12, 2014, now Pat. No. 9,258,400.

(51) Int. Cl.
*H04M 1/725* (2006.01)
*H04M 1/57* (2006.01)

(52) U.S. Cl.
CPC ....... *H04M 1/72522* (2013.01); *H04M 1/576* (2013.01); *H04M 1/72519* (2013.01)

(58) Field of Classification Search
CPC ......... H04M 1/72522; H04M 1/72519; H04M 1/576
See application file for complete search history.

(56) References Cited

U.S. PATENT DOCUMENTS

| | | | |
|---|---|---|---|
| 2003/0216861 A1* | 11/2003 | Sakata | G01C 21/36 715/863 |
| 2004/0027364 A1* | 2/2004 | Ohtani | G06F 1/3228 345/699 |
| 2011/0022307 A1* | 1/2011 | Lee | G01C 21/3664 701/533 |
| 2013/0321340 A1* | 12/2013 | Seo | G06F 1/1641 345/174 |
| 2014/0155123 A1* | 6/2014 | Lee | H04M 1/72519 455/563 |

* cited by examiner

*Primary Examiner* — Joseph Dean, Jr.
(74) *Attorney, Agent, or Firm* — Antonio Ha; U.S. Patent, LLC

(57) ABSTRACT

A method for controlling an electronic device comprises performing a first function and displaying a screen of the electronic device corresponding to the first function, receiving an incoming call, displaying a window on a portion of the screen in response to the reception of the incoming call, the window displaying predetermined information relating to the incoming call, receiving a control signal from a user of the electronic device, and performing a second function in response to the reception of the control signal.

20 Claims, 7 Drawing Sheets

(a)

(b)

(a)

(b)

(c)

(a)

(b)

METHOD FOR CONTROLLING ELECTRONIC DEVICE

CROSS-REFERENCE TO RELATED APPLICATIONS

This application is a continuation of U.S. patent application Ser. No. 14/384,696, filed on Sep. 12, 2014, which is the national stage application of International Patent Application No. PCT/KR2013/001744 filed on Mar. 5, 2013 and claims priority from Korean Patent Application No. 10-2012-0026809, filed on Mar. 15, 2012, the disclosures of which are herein incorporated by reference in their entirety.

TECHNICAL FIELD

The present invention relates to a mobile communication terminal, and in particular, a mobile communication terminal for receiving a call while a navigation service is running and a method for the same, in which when an incoming call is received while a navigation service is in use, a call reception window displaying call connection state information is overlaid on the screen of the navigation service, or the screen of the navigation service is split and the call connection state information is displayed on a split screen.

DISCUSSION OF RELATED ART

Recent mobile communication terminals provide various additional functions, such as camera, video playing, TV, or navigation functions, as well as delivery of simple voice information thanks to the development of technology. Among them, the wireless navigation providing a moving route to a mobile communication terminal is nowadays in wide spread use.

According to such navigation function, a current position of a moving body, which is calculated using the information received from the GPS (Global Positioning System) that is shown on the screen using the GPS is displayed to a driver, and various information necessary for driving, such as the travelling direction of the moving body, the distance to the destination to be reached, the current moving speed of the moving body, the route set by the driver before driving, and the optimal route to the destination, is provided to the driver.

However, the mobile communication terminals according to the prior art, when receiving a call while the navigation service is in use, terminates the running navigation function and then connects to the call. Moreover, although the call connection is terminated, the navigation service should be restarted from the beginning, thus causing inconvenience.

Accordingly, it is disadvantageously impossible to receive both the navigation service and the call connection service.

SUMMARY

Therefore, to solve such problems of the prior art, an object of the present invention is to provide a mobile communication terminal for receiving a call while a navigation service is running and a method for the same, which allows a call reception window displaying call connection state information to be overlaid on the screen provided by the navigation service when an incoming call is received while the navigation service is in use.

Another object of the present invention is to provide a mobile communication terminal for receiving a call while a navigation service is running and a method for the same, which allows the screen provided by the navigation service to be split to display call connection state information on a split portion of the screen when an incoming call is received while the navigation service is in use.

However, the objects of the present invention are not limited to the above-mentioned ones, and other unmentioned objects may be apparent to those skilled in the an from the following description.

To achieve the above objects, according to an aspect of the present invention, a mobile communication terminal may comprise a navigation unit supporting a navigation service; a controller providing call connection state information on an incoming call when the incoming call is received while the navigation service is provided; and a display unit displaying a route guidance image corresponding to the navigation service, displaying a call reception window providing the call connection state information to be overlaid on a preset region in the route guidance image.

Preferably, the display unit adjusts the transparency of the call reception window providing the call connection state information according to a user's selection.

Preferably, the display unit differently displays the color of a portion or whole of the call reception window providing the call connection state information according to the call connection state information.

Preferably, the display unit displays a preset image or picture as a background image of the call reception window providing the call connection state information, displays a transparent background without the preset image or picture so that the route guidance image is shown, or displays an image or picture corresponding to the incoming call.

Preferably, the display unit displays content such as a name or company name as well as an image or picture included in contact information on the call reception window in a case where a received number is contained in the contact information and displays the received number and a preset image or picture on the call reception window in a case where the received number is not contained in the contact information.

Preferably, if the call reception window providing the call connection state information is displayed, the display unit visually provides the navigation service through the route guidance image and aurally provides call connection for the incoming call through a voice.

Preferably, the controller performs control to identify whether incoming call connection is selected if an incoming call is received while the navigation service is provided, and if the incoming call connection is identified to be not selected by a user, the controller performs control to send a text message with preset content to an opposite party's mobile communication terminal that has sent the incoming call.

Preferably, the controller performs control to make a switch to a speaker phone in a case where the user presses the call reception window.

According to another aspect of the present invention, to mobile communication terminal may comprise a navigation unit supporting a navigation service; a controller providing call connection state information on an incoming call when the incoming call is received while the navigation service is provided; and a display unit splitting a display region to display the route guidance image corresponding to the navigation service on a first split region and the call connection state information on a second split region.

Preferably the display unit differently displays the color of a portion or whole of the call reception window providing the call connection state information according to the call connection state information.

Preferably, the display unit displays a preset image or picture as a background image of the call reception window providing the call connection state information or displays an image or picture corresponding to the incoming call.

Preferably, the display unit displays content such as a name or company name as well as an image or picture included in contact information on the call reception window in a case where a received number is contained in the contact information and displays the received number and a preset image or picture on the call reception window in a case where the received number is not contained in the contact information.

Preferably, if the call reception window providing the call connection state information is displayed, the display unit visually provides the navigation service through the route guidance image and aurally provides call connection for the incoming call through a voice.

Preferably, the controller performs control to identify whether incoming call connection is selected if an incoming call is received while the navigation service is provided, and if the incoming call connection is identified to be not selected by a user, the controller performs control to send a text message with preset content to an opposite party's mobile communication terminal that has sent the incoming call.

Preferably, the controller performs control to make a switch to a speaker phone in a case where the user presses the call reception window.

According to still another aspect of the present invention, a method for receiving a call while a navigation service is running may comprise the steps of displaying a route guidance image corresponding to the navigation service, identifying whether the incoming call connection is selected if an incoming call is received while the route guidance image is displayed, and if the incoming call connection is identified to be selected, displaying a call reception window providing the call connection state information to be overlaid on a preset region in the route guidance image.

Preferably, the step of displaying the call reception window to be overlaid is to adjust the transparency of the call reception window providing the call connection state information according to a user's selection Preferably, the step of displaying the call reception window to be overlaid is to differently display the color of a portion or whole of the call reception window providing the call connection state information according to the call connection state information.

Preferably, the step of displaying the call reception window to be overlaid is to display a preset image or picture as a background image of the call reception window providing the call connection state information, displays a transparent background without the preset image or picture so that the route guidance image is shown, or displays an image or picture corresponding to the incoming call.

Preferably, the step of displaying the call reception window to be overlaid is to display content such as a name or company name as well as an image or picture included in contact information on the call reception window in a case where a received number is contained in the contact information and displays the received number and a preset image or picture on the call reception window in a case where the received number is not contained in the contact information.

Preferably, the step of displaying the call reception window to be overlaid is to, if the call reception window providing the call connection state information is displayed, visually provide the navigation service through the route guidance image and aurally provide call connection for the incoming call through a voice.

Further, the method for receiving a call while the navigation service is running may further comprise transmitting a text message with preset content to an opposite party's mobile communication terminal that has sent the incoming call if the incoming call connection is identified to be not selected.

Further, the method for receiving a call while the navigation service is running may further make a switch to a speaker phone when the user presses the call reception window.

According to yet still another aspect of the present invention, a method for receiving a call while a navigation service is running may comprise the steps of displaying a route guidance image corresponding to the navigation service, identifying whether the incoming call connection is selected if an incoming call is received while the route guidance image is displayed, and if the incoming call connection is identified to be selected, splitting a display region to display a mute guidance image corresponding to the navigation service on a first split region and the call connection state information on a second split region.

Preferably, the step of displaying the call connection state information is to differently display the color of a portion or whole of the call reception window providing the call connection state information according to the call connection state information.

Preferably, the step of displaying the call connection state information is to display a preset image or picture as a background image of the call reception window providing the call connection state information or displays an image or picture corresponding to the incoming call.

Preferably, the step of displaying the call connection state information is to display content such as a name or company name as well as an image or picture included in contact information on the call reception window in a case where a received number is contained in the contact information and displays the received number and a preset image or picture on the call reception window in a case where the received number is not contained in the contact information.

Preferably, the step of displaying the call connection state information is to, if the call reception window providing the call connection state information is displayed, visually provide the navigation service through the route guidance image and aurally provide call connection for the incoming call through a voice.

Further, the method for receiving a call while the navigation service is running may further comprise transmitting a text message with preset content to an opposite party's mobile communication terminal that has sent the incoming call if the incoming call connection is identified to be not selected.

Further, the method for receiving a call while the navigation service running may further make a switch to a speaker phone when the user presses the call reception window.

Through this, the present invention provides an effect that enables the navigation service to be steadily received without disturbance from call reception by overlaying the call reception window displaying call connection state information on the screen provided by the navigation service when an incoming call is received while the navigation service is in use.

Further, the present invention provides an effect that may reduce the risk of accident that may occur upon manipulation of the terminal by overlaying the call reception window displaying call connection state information on the screen provided by the navigation service when an incoming call is received while the navigation service is in use.

DESCRIPTION OF EMBODIMENTS

Figure 1:
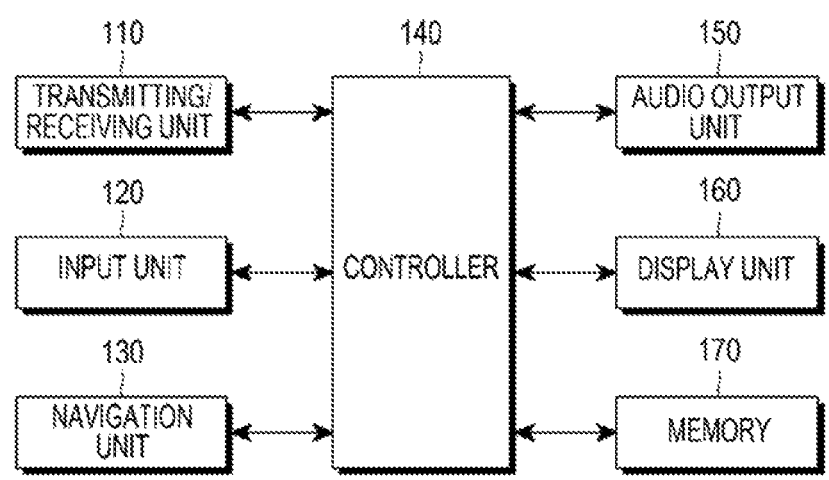
FIG. 1 is a view illustrating a mobile communication terminal for receiving a call while a navigation service is running according to an embodiment of the present invention.

Hereinafter, a mobile communication terminal for receiving a call while a navigation service is running and a method for the same according to an embodiment of the present invention will be described with reference to FIGS. 1 to 7.

The detailed description primarily focuses on what is necessary for understanding the operation or actions according to the present invention. The same reference denotations in the drawings refer to the same elements throughout the specification. Further, when determined to make the gist of the present invention unnecessarily unclear in describing the present invention, the detailed description of the known functions or configurations is omitted.

At this time, according to the present invention, a new method is proposed which 1) displays a call reception window displaying call connection state information to be overlaid on the screen on which a navigation service is provided when an incoming call is received while the navigation service is in use in a mobile communication terminal, or 2) splits the screen on which the navigation service is provided to display a route guidance image on a split portion of the screen and the call connection state information on another split portion of the screen.

FIG. 1 is a view illustrating a mobile communication terminal for receiving a call during a navigation service according to an embodiment of the present invention.

As shown in FIG. 1, the mobile communication terminal for providing a navigation service according to the present invention may include to transmitting/receiving unit 110, an input unit 120, a navigation unit 130, a controller 140, an audio output unit 150, a display unit 160, and a memory 170.

Here, the mobile communication terminal is a device that may receive a mobile communication service using a mobile communication network may in concept include, e.g., a mobile phone, a smartphone, a laptop computer, or a PDA.

The transmitting/receiving unit 110 may transmit an outgoing call to an opposite party's mobile communication terminal or an incoming call from the opposite party's mobile communication terminal and may transmit and receive a voice according to a call connection.

The input unit 120 may be input with information as per the user's key or menu manipulation. The user may set, e.g., an incoming call receiving function to display information relating to an incoming call when the incoming call is received through the input unit 120 while the navigation service is in use.

The navigation unit 130 may support the navigation service. That is, the navigation unit 130 may receive location information from a GPS satellite and may provide driving information of a moving body, e.g., a vehicle, using the received location information and pre-stored map data.

The controller 140 may perform control to receive the driving information or the like from the navigation unit 130 and to output the received driving information or the like through the audio output unit 150 and the display unit 160. In particular, when an incoming call is received while the navigation service is in use, the controller 140 may provide call connection state information not to affect the navigation service.

As used herein, the call connection state information may include the opposite party's phone number, the opposite party's name, and the call time.

The audio output unit 150 may output to route guidance voice in case the navigation service is in use and output the opposite party's voice in case the call is connected. At this time, the audio output unit 150 outputs the route guidance voice while the navigation service is in use, and if a call is connected, cuts off the output of the route guidance voice to output the opposite party's.

The display unit 160 may display a route guidance image in case the navigation service is in use. In particular, when an incoming call is received while the navigation service is running, the display unit 160 1) may display a call reception window providing call connection state information to be overlaid on a preset region in the route guidance image and 2) may split the display region to display the route guidance image on a first split region and the call connection state information on a second split region.

If the call reception window providing the call connection state information is displayed, the display unit 160 visually provides the navigation service through the route guidance image and aurally provides the call connection for the incoming call through a voice.

At this time, the display unit 160 may be a touchscreen that allows for manipulation on screen.

The memory 170 may store a phone number list, images or pictures, map data, etc.

Figure 2:
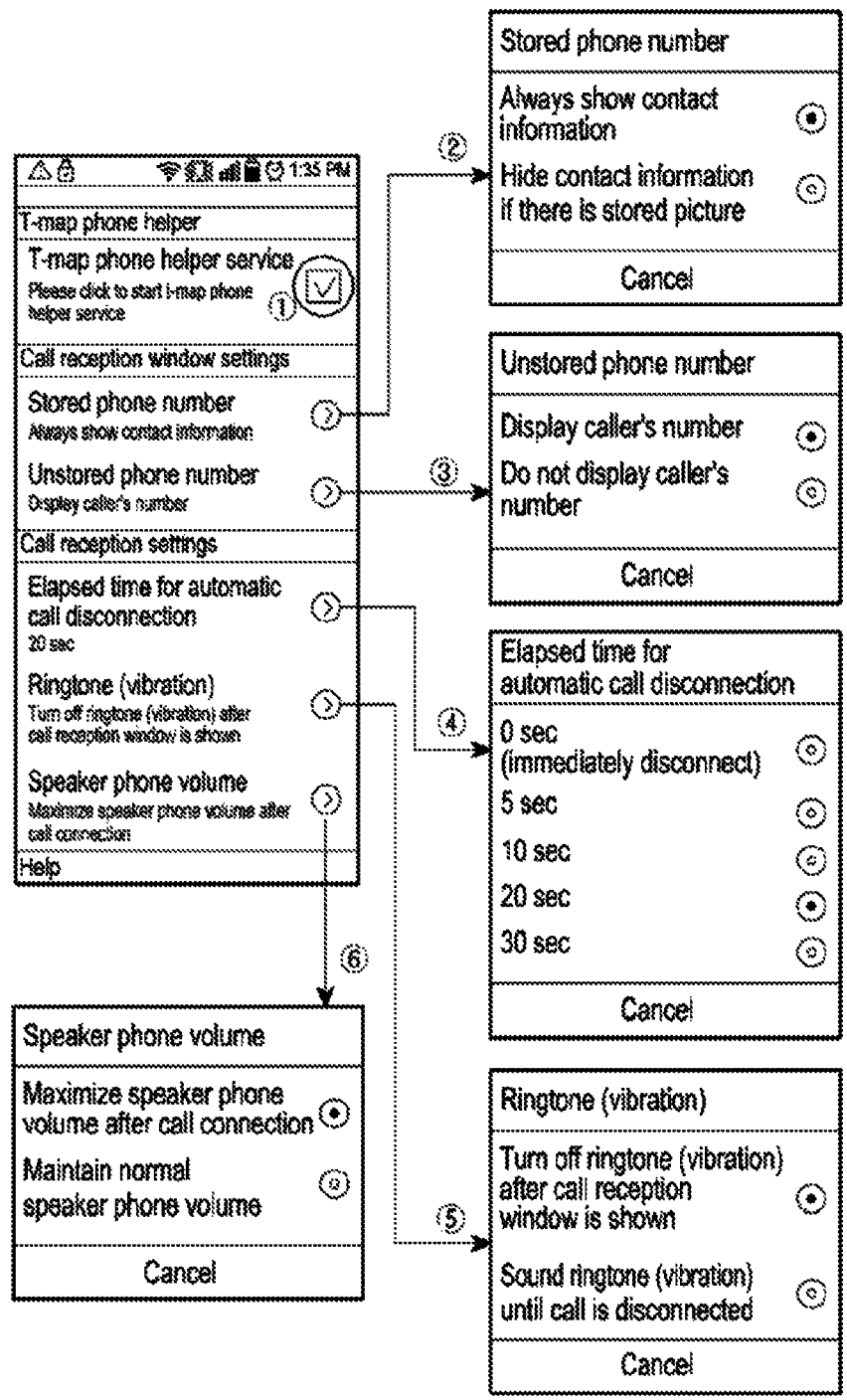
FIG. 2 is a view illustrating a process of setting an incoming call receiving function according to an embodiment of the present invention.

FIG. 2 is a view illustrating a process of setting an incoming call receiving function according to an embodiment of the present invention.

As shown in FIG. 2, the mobile communication terminal according to the present invention sets the incoming call receiving function using, e.g., "T-map phone helper."

1) In item ①, whether to use the T-map phone helper service may be set. That is, the T-map phone helper service is started or paused. If the T-map phone helper service is started, when a call is received during the route guidance, a call reception window is shown to be overlaid on the route guidance screen. If the T-map phone helper service is paused, when a call is received during the route guidance, a default call reception screen is displayed on the route guidance screen to cover the route guidance screen.

2) In item ②, whether to allow contact information to be always shown may be set. That is, this is a setting for the case where when a call is received, the phone number therefor is retained in the contact information. It is set whether to display, if a picture, along with the phone number, is retained in the contact information, the picture alone or together with the content of the contact information, on the call reception window overlaid on the route guidance screen.

3) In item ③, it may be set whether to display the caller's number that is not retained. That is, this is a setting, for the case where when a call is received, the phone number therefor is not retained in the contact information. It is set whether to display the caller's number or a picture alone on the call reception window overlaid on the route guidance screen.

4) In item ④, an elapsed time to automatically disconnect call may be set. That is if upon reception of a call, the call reception window overlaid on the route guidance screen is left unclicked, the T-map phone helper service automatically hangs up the call. The wait time from when the call is received to when the call is automatically disconnected is set. In other words, if the call reception window is not pressed for a set time after the call reception window is displayed overlaid on the route guidance screen, the T-map phone helper automatically disconnects the call.

For example, in case 0 sec immediately disconnect) is set, the T-map phone helper does not display the call reception window on the route guidance screen when a call is received.

5) In item ⑤, a ring tone or vibration mode after the call reception window is displayed may be set. That is, it is set whether to sound off a ringtone when the call reception window is displayed overlaid on the route guidance screen.

6) In item ⑥, the volume of the speaker phone after call connection may be set. That is, when a call is received during the navigation service, the T-map phone helper automatically switches the phone to speaker phone mode or hands-free mode. At this time, it is set whether to automatically set the volume of the speaker phone to the maximum. In case 'after call connection, maximize the speaker volume' is set, the maximum volume applies upon call connection, and if the call is disconnected, it automatically turns back to the original volume.

Figure 3:
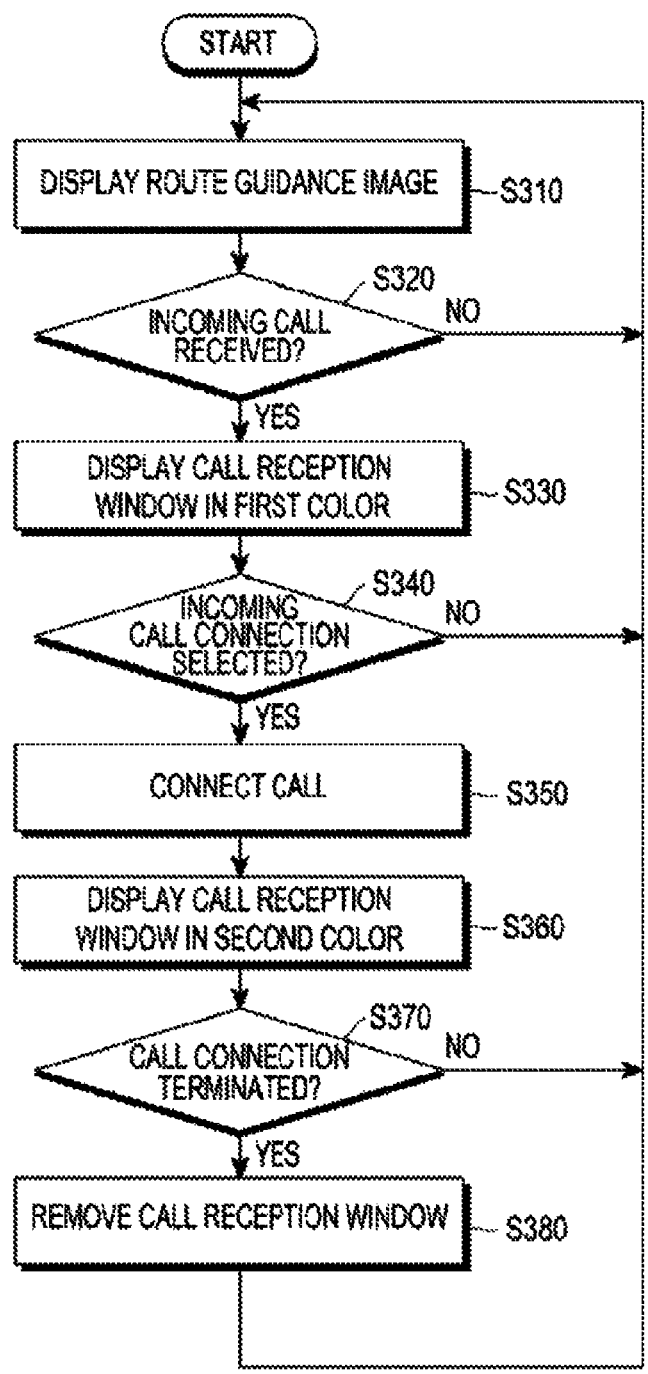
FIG. 3 is a first view illustrating a method for receiving a call during a navigation service according to an embodiment of the present invention.
Figure 4:
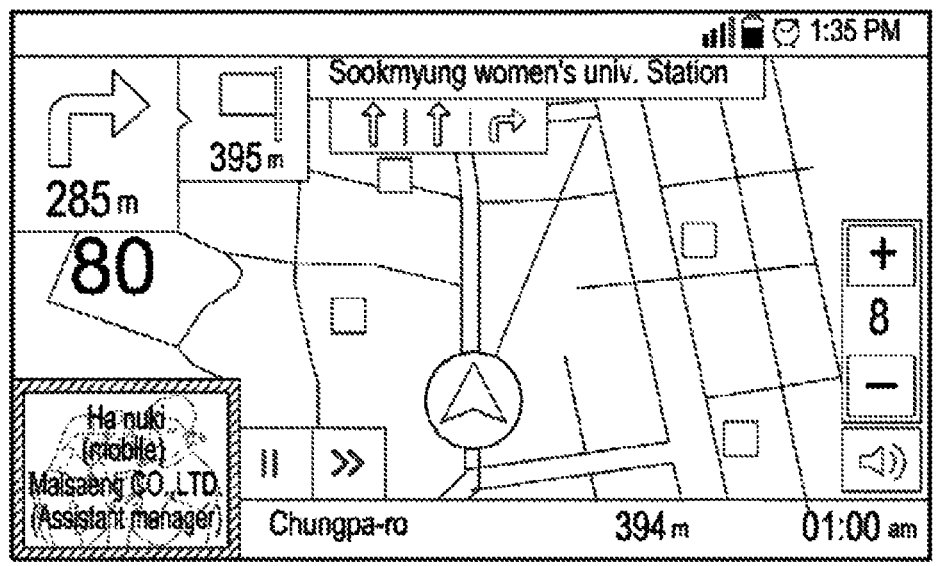
FIG. 4 is a first view illustrating a screen displaying a call connection state according to an embodiment of the present invention.
Figure 4:
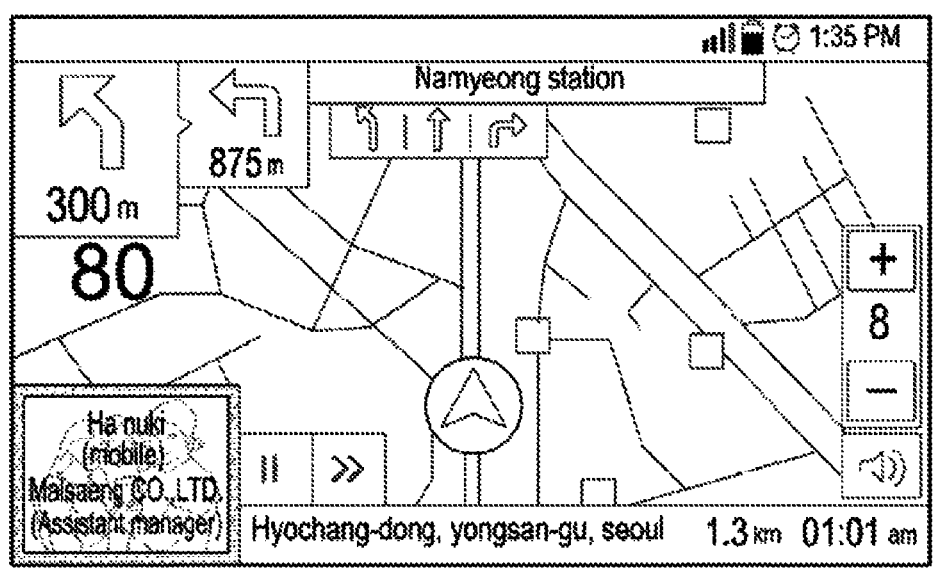

FIG. 3 is a first view illustrating a method for receiving a call during a navigation service according to an embodiment of the present invention, and FIG. 4 is a first view illustrating the screen displaying a call connection state according to an embodiment of the present invention.

Referring to FIGS. 3 and 4, the mobile communication terminal according to the present invention, when a navigation service is activated, may display a route guidance image through the display unit (S310).

Next, the mobile communication terminal may identify whether an incoming call is received (S320).

Then, if the incoming call is resultantly identified to be received, the mobile communication terminal displays a call reception window representing call connection state information, e.g., the opposite party's phone number or name, on the route guidance screen as shown in FIG. 4(a), wherein the call reception window is displayed in a first color (S330) so that it may be identified whether the incoming call connection is selected (S340).

Thereafter, if the incoming call connection is identified to be selected, the mobile communication terminal connects a call as shown in FIG. 4(b) (S350) and changes the color of the call reception window to a second color to represent the call connection (S360).

That is, if the user presses the call reception window flickering in red, the mobile communication terminal connects the call—for example, automatically switches to hands-free mode, i.e., speaker phone mode to connect the call, and if the call is connected, the mobile communication terminal changes the color of the edge of the call reception window to green. The edge of the call reception window staying in green represents that the line is busy.

At this time, in case the received number is contained in the contact information, the content such as name or company name as well as the image or picture included in the contact information is displayed on the call reception window, and in case the received number is not contained in the contact information, the received phone number together with the preset image or picture is displayed.

In contrast, unless the incoming call connection is identified to be selected by the user, the mobile communication terminal sends a text message with preset content to the opposite party's mobile communication terminal that has sent the incoming call. For example, the mobile communication terminal may create a text message saying "Now I am driving so I cannot respond to this call" and send the text message to the opposite party's mobile communication terminal.

Next, the mobile communication terminal may identify whether the call connection is terminated (S370) if the call connection is terminated, remove the call reception window (S380), and display back only the route guidance screen. That is, if the call connection is terminated in the mobile communication terminal as the opposite party hangs up the phone, or the call reception window is pressed to disconnect the call, for example, the call reception window disappears from the route guidance image.

Figure 5:
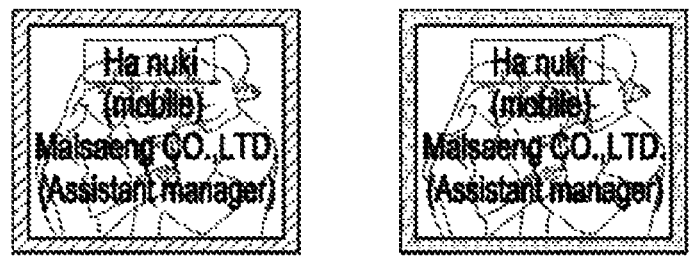
FIG. 5 is a view illustrating various types of call reception windows according to an embodiment of the present invention.
Figure 5:
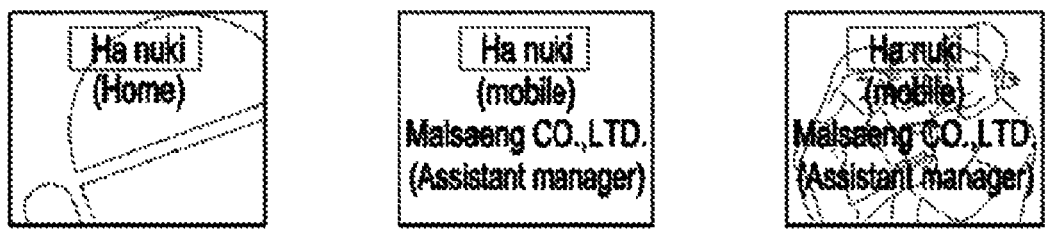
Figure 5:

FIG. 5 is a view illustrating various types of call reception windows according to an embodiment of the present invention.

As shown in FIG. 5(a), according to an embodiment of the present invention, the color of the edge of the call reception window may be set so that the color of the edge when an incoming call is received is different from the color of the edge when the incoming call is connected. For example, As shown in FIG. 5(b), the call reception window may be displayed to show a preset image or picture as its background image, may be displayed transparently so that the route guidance screen is shown without the preset image or picture, or may be displayed to show an image or picture corresponding to an incoming call.

The call reception window may adjust its transparency according to the user's selection as shown in FIG. 5(c). That is, the call reception window may be adjusted so that the window itself or its content is transparent or opaque through an adjusting bar.

Figure 6:
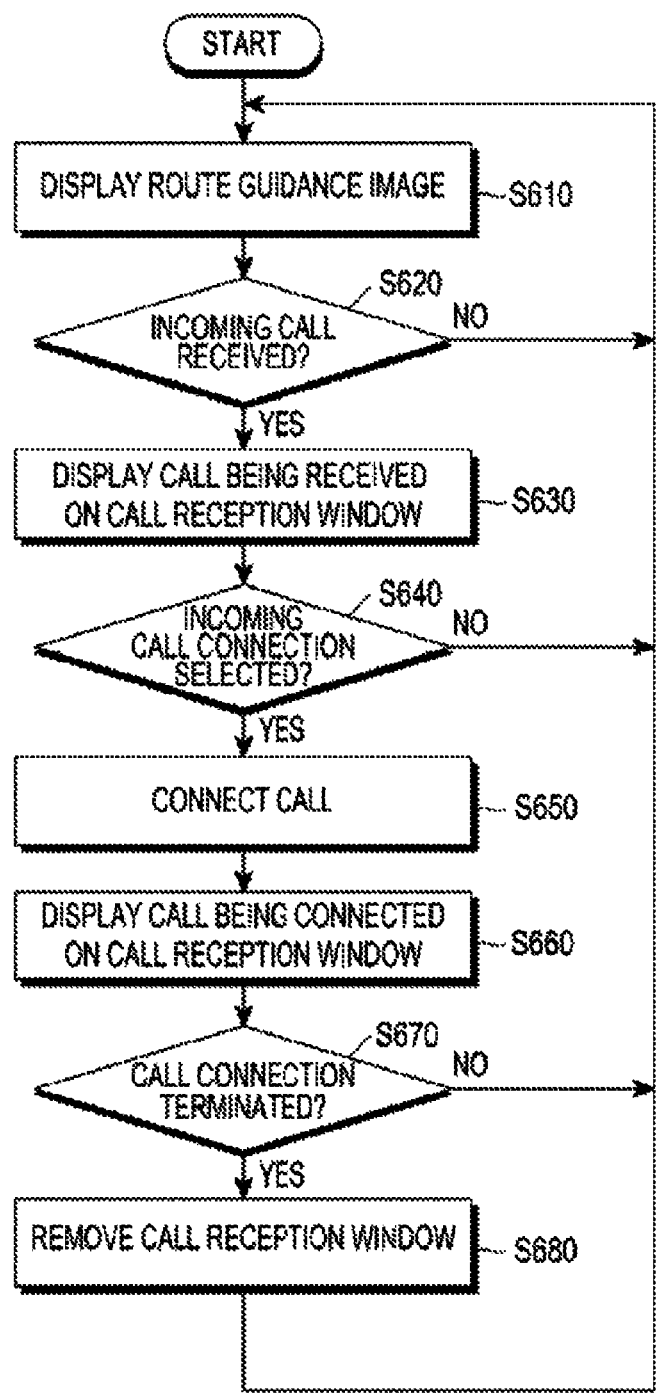
FIG. 6 is a second view illustrating a method for receiving a call during a navigation service according to an embodiment of the present invention.
Figure 7:
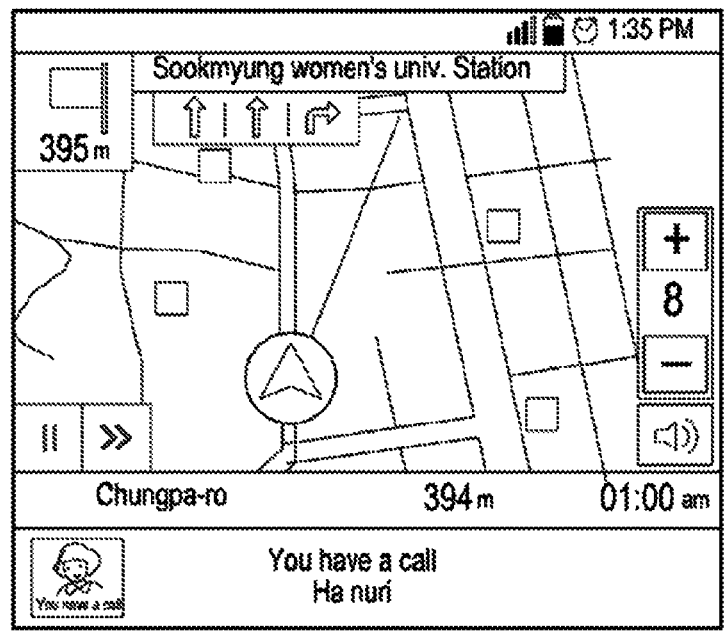
FIG. 7 is a second view illustrating to screen displaying a call connection state according to an embodiment of the present invention.
Figure 7:
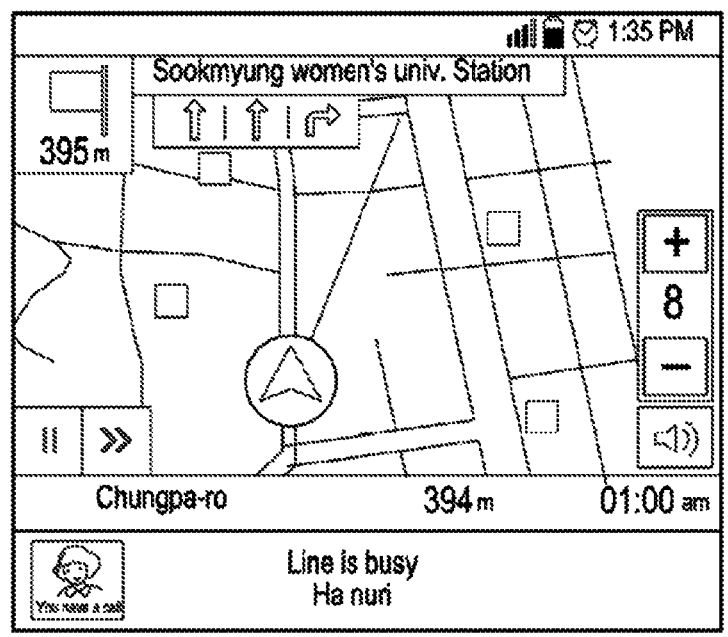

FIG. 6 is a second view illustrating a method for receiving a call during a navigation service according to an embodiment of the present invention, and FIG. 7 is a second view illustrating the screen displaying a call connection state according to an embodiment of the present invention.

Referring to FIGS. 6 and 7, the mobile communication terminal according to the present invention, when a navigation service is activated, may display a route guidance image through the display unit (S610).

Next, the mobile communication terminal may identify whether an incoming call is received (S620).

Thereafter, as shown in FIG. 7(a), if the incoming call is identified to be received, the mobile communication terminal splits the screen to display the route guidance screen on a first split region and to indicate the call connection state information, e.g., the call being received, with, e.g., the opposite party's phone number or name on a second split region, i.e., the call reception window (S630) to identify whether the incoming call connection has been selected (S640).

Then, if the incoming call connection is identified to be selected, the mobile communication terminal may connect the call as shown in FIG. 7(b) (S650) and may display the call being connected on the second split region as the call connection state information (S660).

That is, if the user presses the call reception window saying "you have a call," the mobile communication terminal connects the call—for example, automatically turns into hands-free mode, i.e., speaker phone mode, to connect the phone call, and if the call is connected, the call reception window is changed to say "line is busy" by which the call being ongoing is indicated.

At this time, in case the received number is included in the contact information, the call reception window displays the content such as name or company name as well as the image or picture contained in the contact information, and unless the received number is included in the contact information, the call reception window displays a preset image or picture, together with the received number.

In contrast, if the incoming call connection is identified to be not selected be the user, the mobile communication terminal sends a text message with preset content to the opposite party's mobile communication terminal that has sent the incoming call. For example, the mobile communication terminal may create a text message saying "Now I am driving so I can't respond to this call" and send the same to the opposite party's mobile communication terminal.

Next, the mobile communication terminal may identify whether the call connection is terminated (S670), and if the call connection is terminated, may remove the call reception window (S680) to display back only the route guidance screen. That is, if the call connection is terminated in the mobile communication terminal as the opposite party hangs up the phone, or the call reception window is pressed to disconnect the call, for example, the call reception window disappears from the route guidance image.

Although the case where the mobile communication terminal according to the present invention receives an incoming call is described as an example, the present invention is not limited thereto, and the present invention may also apply to the case where an outgoing call is transmitted.

For example, according to the present invention, if call connection mode is selected while the navigation service is in use, an opposite party's number is received from the user on the screen for call connection, an outgoing call is transmitted, and the screen for the call connection is removed. Then, 1) a call transmitting window displaying call connection state information is overlaid on the screen where the navigation service is provided, or 2) the screen where the navigation service is provided is split to display the route guidance image on a split portion of the screen and the call to connection state information on another split portion of the screen.

Meanwhile, the above-described embodiments of the present invention may be created as computer-readable program and may be implemented in a general-purpose digital computer that operates the program using a computer-readable recording medium. The computer readable recording medium includes storage media such as magnetic storage media (for example, ROMs, floppy discs, hard discs, etc.), and optical reading media (for example, CD-ROMs. DVDs, etc.).

Although exemplary embodiments of the present invention have been described above, it may be understood by those skilled in the art that various changes or modifications may be made thereto without departing from the essential features of the present invention. Accordingly, it should be noted that the embodiments set forth herein are provided not for limiting the present invention but for describing the present invention and that the scope of the present invention is not limited thereby and thereto. The scope of the present invention should be construed by the following claims, and all the technical scope belonging to the equivalents of the present invention should be interpreted to belong; to the scope of the present invention.

What is claimed is:

1. A method for controlling an electronic device, the method comprising:
performing a first function and displaying a screen of the electronic device corresponding to the first function;
receiving an incoming call;
displaying a window on a portion of the screen in response to the reception of the incoming call, the window displaying predetermined information relating to the incoming call;
receiving a control signal from a user of the electronic device; and
performing a second function in response to the reception of the control signal, wherein displaying the window on the portion of the screen includes overlaying the window on the portion of the screen without affecting the first function when the incoming call is received while the first function is in use, and wherein the window remains overlaid on the portion of the screen when the control signal is received.

2. The method of claim 1, wherein performing the second function includes changing the color of whole or a portion of the window from a first color to a second color different from the first color when the control signal accepts the incoming call.

3. The method of claim 2, wherein the portion of the window is a surrounding edge of the window.

4. The method of claim 1, wherein performing the second function includes removing the window from the screen when the control signal rejects the incoming call.

5. The method of claim 1, wherein the window is transparent or semi-transparent to allow the screen to be viewed.

6. The method of claim 1, wherein displaying the window on the portion of the screen includes displaying the window on the portion split but not overlaid.

7. The method of claim 1, wherein performing the second function includes sending out a predetermined message at a phone number associated with the incoming call.

8. The method of claim 1, wherein the first function includes a route navigation function.

9. The method of claim 1, wherein when the control signal is not received, the window is removed from the screen.

10. The method of claim 1, wherein when the incoming call stops being received, the window is removed from the screen.

11. The method of claim 1, wherein the window displays an image corresponding to the incoming call.

12. The method of claim 1, wherein second function includes sending a call or a message at a phone number associated with the input signal.

13. The method of claim 1, wherein the first function continues to run while the window is displayed on the portion of the screen.

14. The mobile of claim 1, further comprising connecting the incoming call through a speaker when the incoming call is accepted.

15. The method of claim 1, wherein the window is sized and dimensioned not to interfere with running the first function.

16. A method for controlling an electronic device, the method comprising:
performing a route navigation function and displaying a first screen corresponding to the route navigation function;
overlaying a window on a portion of the first screen when receiving an incoming call without interfering with the route navigation function running, the window displaying predetermined information corresponding to the incoming call; and
changing a state of the window or the predetermined information corresponding to the incoming call depending on whether the incoming call is accepted or rejected, wherein the overlaid window on the portion of the screen is displayed without affecting the route navigation function when the incoming call is received while the route navigation function is in use, wherein when the incoming call is accepted, the window remains overlaid on the first screen, and wherein a first size of the window when the incoming call is received and a second size of the window when the incoming call is accepted are substantially the same.

17. The method of claim 16, further comprising:
receiving a control signal from a user of the electronic device; and
performing a second function in response to the reception of the control signal.

18. The method of claim 17, wherein second function includes sending a call or a message at a phone number associated with the input signal.

19. An electronic device, comprising:
a display;
a communication unit; and
a controller performing a first function and displaying a screen corresponding to the first function on the display, receiving an incoming call through the communication unit, displaying a window on a portion of the screen in response to the reception of the incoming call on the display, the window displaying predetermined information relating to the incoming call, receiving a control signal from a user of the electronic device through the display, and performing a second function in response to the reception of the control signal, wherein when the control signal is received, a state of the window is changed, wherein displaying the window on the portion of the screen includes overlaying the window on the portion of the screen without affecting the first function when the incoming call is received while the first function is in use, wherein when the incoming call is accepted, the window remains overlaid on the screen corresponding to the first function, and wherein a first size of the window when the incoming call is received and a second size of the window when the control signal is received are substantially the same.

20. The electronic device of claim 19, wherein when the control signal is received, the window remains in substantially the same size.

* * * * *